US 11,909,650 B2

(12) United States Patent
Bonica

(10) Patent No.: US 11,909,650 B2
(45) Date of Patent: Feb. 20, 2024

(54) INTERNET PROTOCOL OPERATIONS AND MANAGEMENT OPTION

(71) Applicant: Juniper Networks, Inc., Sunnyvale, CA (US)

(72) Inventor: Ronald Bonica, Sterling, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/356,557

(22) Filed: Mar. 18, 2019

(65) Prior Publication Data

US 2024/0015103 A1 Jan. 11, 2024

Related U.S. Application Data

(60) Provisional application No. 62/809,148, filed on Feb. 22, 2019.

(51) Int. Cl.
*H04L 47/17* (2022.01)
*H04L 45/00* (2022.01)
(Continued)

(52) U.S. Cl.
CPC .......... *H04L 47/17* (2013.01); *H04L 43/0894* (2013.01); *H04L 45/34* (2013.01); *H04L 45/74* (2013.01); *H04L 69/22* (2013.01)

(58) Field of Classification Search
CPC ..... H04L 47/17; H04L 69/22; H04L 43/0894; H04L 45/74; H04L 45/34; H04L 12/801;
(Continued)

(56) References Cited

U.S. PATENT DOCUMENTS 9,787,559 B1 * 10/2017 Schroeder ........... H04L 41/5038
9,912,566 B1 * 3/2018 Penno .................. H04L 43/10
(Continued)

FOREIGN PATENT DOCUMENTS

CN 102271079 A 12/2011
CN 103181134 B 6/2013
(Continued)

OTHER PUBLICATIONS

Https://tools.ietf.org/html/rfc2460 (Year: 1998).*
(Continued)

*Primary Examiner* — Schquita D Goodwin
*Assistant Examiner* — Mehulkumar J Shah
(74) *Attorney, Agent, or Firm* — Harrity & Harrity, LLP

(57) ABSTRACT

A network device may receive an internet protocol (IP) packet that includes an IP packet header. The IP packet may include at least one extension header, which includes at least one of: a hop-by-hop options header, a first destination options header that precedes a routing header, or a second destination options header that precedes an upper-layer header. The network device may determine that: the hop-by-hop options header includes an Operations and Management capabilities (OAM) option, the first destination options header includes the OAM option and an IP address of the network device matches a destination IP address or a routing IP address identified in the routing header, or the second destination options header includes the OAM option and the IP address of the network device matches the destination IP address. The network device may perform one or more actions indicated by the OAM option.

20 Claims, 11 Drawing Sheets

(51) Int. Cl.
*H04L 45/74* (2022.01)
*H04L 43/0894* (2022.01)
*H04L 69/22* (2022.01)

(58) Field of Classification Search
CPC ....... H04L 29/06; H04L 12/26; H04L 12/741; H04L 12/721; H04L 12/24; H04L 41/06; H04L 41/12; H04L 69/161; H04L 43/02; H04L 47/2483
USPC ...................................................... 709/238
See application file for complete search history.

(56) References Cited

U.S. PATENT DOCUMENTS

| | | | |
|---|---|---|---|
| 10,187,209 B2 | 1/2019 | Dara et al. | |
| 10,382,334 B2* | 8/2019 | Previdi | H04L 69/22 |
| 2008/0037526 A1* | 2/2008 | Dong | H04L 43/50 370/352 |
| 2008/0159287 A1* | 7/2008 | Nagarajan | H04L 69/22 370/252 |
| 2011/0222412 A1* | 9/2011 | Kompella | H04L 47/26 370/241.1 |
| 2013/0010600 A1* | 1/2013 | Jocha | H04L 41/046 370/236.2 |
| 2014/0119387 A1* | 5/2014 | Jiang | H04L 61/6059 370/474 |
| 2015/0256456 A1* | 9/2015 | Previdi | H04L 45/745 370/392 |
| 2016/0352633 A1* | 12/2016 | Kapadia | H04L 12/4633 |
| 2017/0078175 A1* | 3/2017 | Xu | H04L 43/0811 |
| 2017/0250907 A1* | 8/2017 | Pignataro | H04L 43/04 |
| 2018/0227168 A1* | 8/2018 | Ward | H04L 12/4641 |
| 2019/0149449 A1* | 5/2019 | Morris | H04L 45/16 709/238 |
| 2019/0158638 A1* | 5/2019 | Yanai | H04L 69/325 |
| 2019/0288938 A1* | 9/2019 | Song | H04L 47/2483 |
| 2020/0084147 A1* | 3/2020 | Gandhi | H04L 45/70 |
| 2020/0244582 A1* | 7/2020 | Li | H04L 47/32 |

FOREIGN PATENT DOCUMENTS

| | | |
|---|---|---|
| CN | 107567704 A | 1/2018 |
| EP | 2706711 B1 | 10/2016 |

OTHER PUBLICATIONS

Extended European Search Report for Application No. EP19180608.2, dated Jan. 17, 2020, 10 pages.
Deering et al., "Internet Protocol, Version 6 (IPv6) Specification", Internet Engineering Task Force (IETF), Request for Comments: 8200, Jul. 2017, 42 pages. https://tools.ietf.org/pdf/rfc8200.pdf.
Mills et al., "Network Time Protocol Version 4: Protocol and Algorithms Specification", Internet Engineering Task Force (IETF), Request for Comments: 5905, Jun. 2010, 110 pages. https://tools.ietf.org/pdf/rfc5905.pdf.
Ali et al., "Operations, Administration, and Maintenance (OAM) in Segment Routing Networks with IPv6 Data plane (SRv6)", Spring Working Group, Oct. 2018, 27 pages. https://tools.ietf.org/pdf/draft-all-spring-srv6-oam-02.pdf.
Bhandari et al., "In-situ OAM IPv6 Options", ippm,6man, Oct. 2018, 8 pages. https://tools.ietf.org/pdf/draft-ioametal-ippm-6man-ioam-ipv6-options-01.pdf.
Malkin, G., "Traceroute Using an IP Option", Network Working Group, Request for Comments: 1393, Xylogics, Inc., Jan. 1993, 7 pages. https://tools.ietf.org/pdf/rfc1393.pdf.
Ali et al., "Operations, Administration, and Maintenance (OAM) in SegmentRouting Networks with IPv6 Data plane (SRv6)," Internet Engineering Task Force(IETF), Feb. 2018.
Deering et al., "Internet Protocol Version 6 (IPv6) Specification," InternetEngineering Task Force (IETF), Dec. 2015.
Previdi et al., "IPv6 Segment Routing Header (SRH)," Internet Engineering Task Force(IETF), Apr. 2018, 26 pages.

* cited by examiner

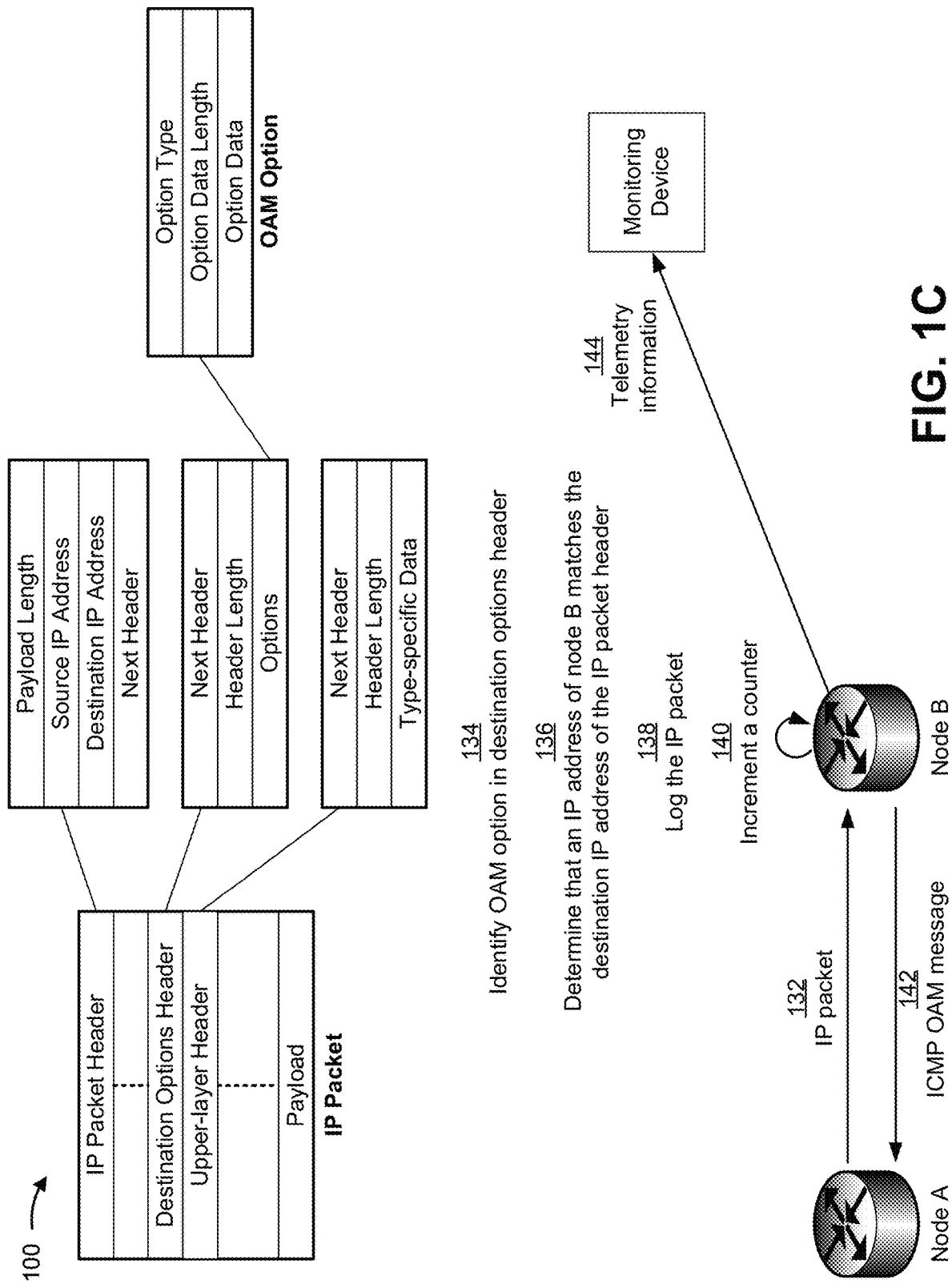

| Bit | Action | Notes |
|---|---|---|
| 0 | Log the packet | The processing node creates a log entry. The log entry reflects the time at which it was created. It also reflects the time at which the packet arrived. |
| 1 | Count the packet | The processing node increments a counter. |
| 2 | Send an ICMPv6 OAM | The processing node sends an ICMP OAM message to the packet's source. The OAM message indicates the time at which the packet arrived. |
| 3 | Send telemetry | The processing node sends telemetry to a monitoring station. Telemetry includes the packet and the time at which the packet arrived. |
| 4-15 | Reserved | |

Example OAM option data bits mapped to actions

FIG. 2

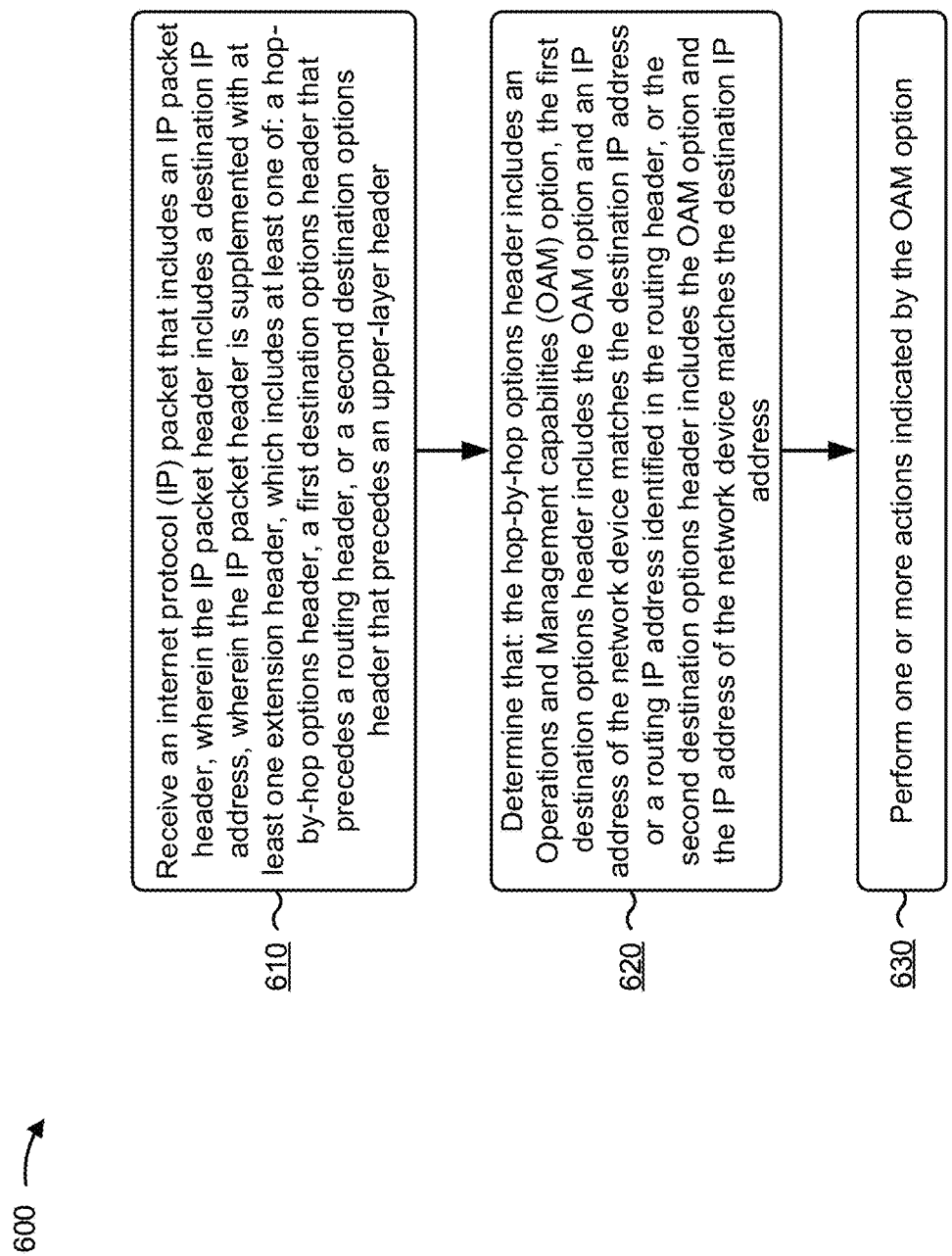

INTERNET PROTOCOL OPERATIONS AND MANAGEMENT OPTION

RELATED APPLICATION

This application claims priority under 35 U.S.C. § 119 to U.S. Provisional Patent Application No. 62/809,148, filed on Feb. 22, 2019, the content of which is incorporated by reference herein in its entirety.

BACKGROUND

An Internet Protocol (IP) packet may be routed through one or more network devices that are part of a network. The IP packet can include a header and one or more extension headers that provide information to the one or more network devices on how to process the IP packet.

SUMMARY

According to some implementations, a method may include receiving, by a network device, an internet protocol (IP) packet that includes an IP packet header, wherein the IP packet header includes a destination IP address, wherein the IP packet header is supplemented with at least one extension header, which includes at least one of: a hop-by-hop options header, a first destination options header that precedes a routing header, or a second destination options header that precedes an upper-layer header. The method may include determining, by the network device, that: the hop-by-hop options header includes an Operations and Management capabilities (OAM) option, the first destination options header includes the OAM option and an IP address of the network device matches the destination IP address or a routing IP address identified in the routing header, or the second destination options header includes the OAM option and the IP address of the network device matches the destination IP address. The method may include performing one or more actions indicated by the OAM option.

According to some implementations, a network device may include one or more memories; and one or more processors to receive an internet protocol (IP) packet that includes an IP packet header, wherein the IP packet header includes a destination IP address, wherein the IP packet header is supplemented with at least one extension header, which includes at least one of: a hop-by-hop options header, a first destination options header that precedes a routing header, or a second destination options header that precedes an upper-layer header. The one or more processors may determine that the hop-by-hop options header, the first destination options header, or the second destination options header includes an Operations and Management capabilities (OAM) option. The one or more processors may and perform one or more actions indicated by the OAM option when: the hop-by-hop options header includes the OAM option, the first destination options header includes the OAM option and an IP address of the network device matches the destination IP address or a routing IP address identified in the routing header, or the second destination options header includes the OAM option and the IP address of the network device matches the destination IP address.

According to some implementations, a non-transitory computer-readable medium may store one or more instructions that, when executed by one or more processors of a network device, cause the one or more processors to receive an internet protocol (IP) packet that includes an IP packet header, wherein the IP packet header includes a source IP address and a destination IP address, wherein the IP packet header is supplemented with at least one extension header, which includes at least one of: a hop-by-hop options header, a first destination options header that precedes a routing header, or a second destination options header that precedes an upper-layer header. The one or more instructions may cause the one or more processors to determine an IP address of the network device and determine that: the hop-by-hop options header includes an Operations and Management capabilities (OAM) option, the first destination options header includes the OAM option and the IP address of the network device matches the destination IP address or a routing IP address identified in the routing header, or the second destination options header includes the OAM option and the IP address of the network device matches the destination IP address. The one or more instructions may cause the one or more processors to generate, based on the OAM option, an ICMP OAM message and send the ICMP OAM message to the source IP address.

BRIEF DESCRIPTION OF THE DRAWINGS

FIGS. 1A-1C are diagrams of one or more example implementations described herein.

FIG. 2 is a diagram of example option data field bits, of an Operations and Management capabilities (OAM) option, mapped to one or more actions.

FIGS. 6-8 are flow charts of example processes for an Internet Protocol (IP) OAM option.

DETAILED DESCRIPTION

Figure 1A:
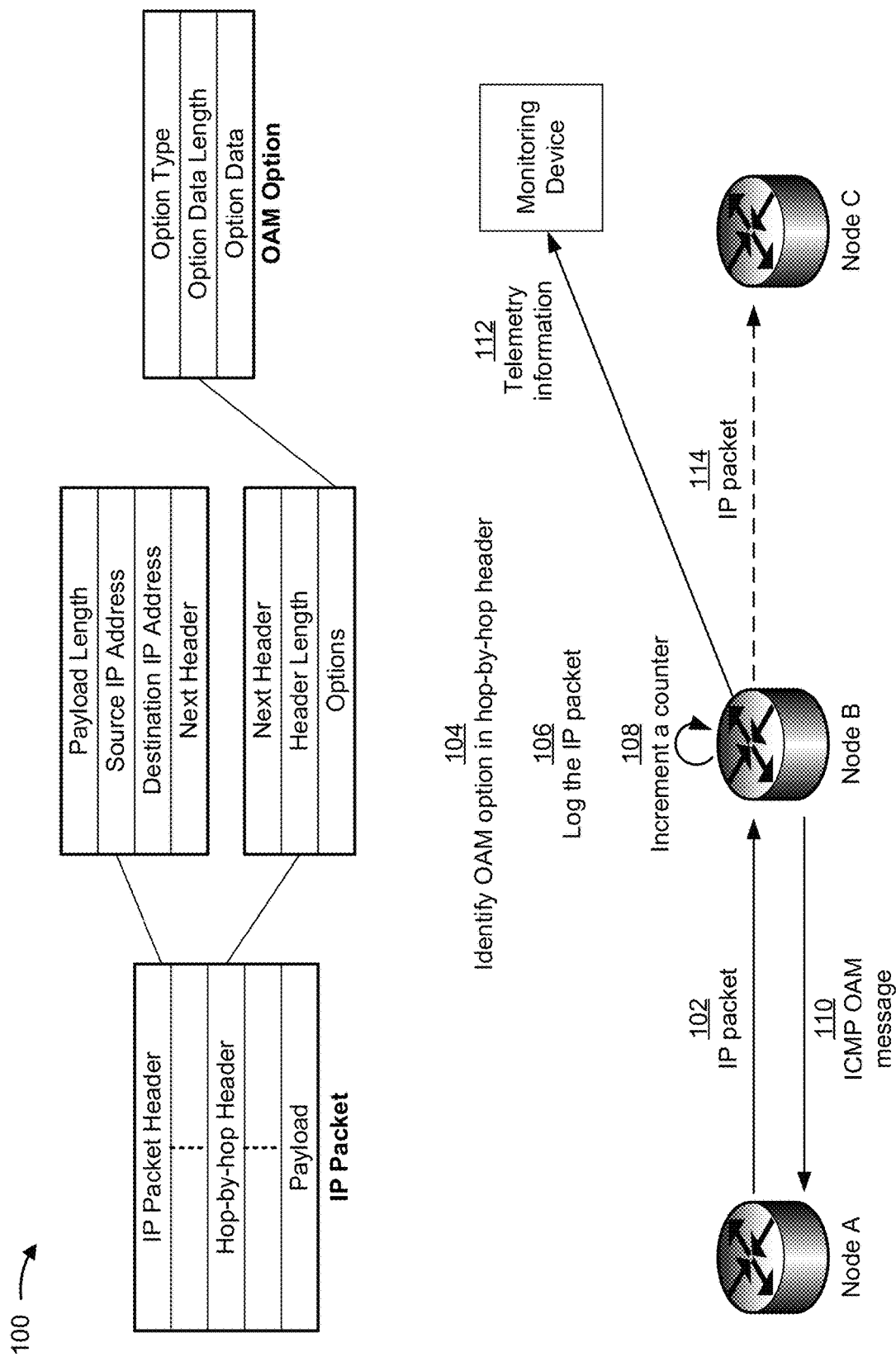

The following detailed description of example implementations refers to the accompanying drawings. The same reference numbers in different drawings may identify the same or similar elements.

A network of network devices may be used to route packets. In many cases, one or more network devices of the network may route an Internet Protocol (IP) packet (e.g., a packet that conforms to IP version 6 (IPv6)) through the network. In some cases, a particular network device, of the one or more network devices of the network, does not function properly and cannot facilitate routing of the IP packet through the network. In such a case, current network diagnostic tools cannot identify an issue with the particular network device based on how the network device processed the IP packet. Moreover, IPv6 does not specify an Operations and Management capabilities (OAM) option that can facilitate diagnostics of the network device. This may cause the network to utilize additional resources (e.g., resources of other networking devices to assist in routing the IP packet or a replacement IP packet) to compensate for an underperforming, malfunctioning, and/or inoperable network device.

Some implementations described herein provide a network device that is capable of identifying and processing an OAM option included in an extension header (e.g., a hop-by-hop options header, a first destination options header that precedes a routing header, or a second destination options header that precedes an upper-layer header) of an IP packet received by the network device. In some implementations, the network device may perform one or more actions indicated by the OAM option when: the hop-by-hop options header includes the OAM option, the first destination options header includes the OAM option and an IP address of the network device matches a destination IP address included in an IP packet header of the IP packet or a routing IP address identified in the routing header, or the second destination options header includes the OAM option and the IP address of the network device matches the destination IP address. In some implementations, the one or more actions may include: logging the IP packet, incrementing a counter associated with the network device, sending an Internet Control Message Protocol (ICMP) OAM message to a source IP address included in the IP packet header, or sending telemetry information concerning the IP packet to a monitoring device.

In this way, some implementations described herein can conserve resources of the network that would otherwise be used to compensate for an underperforming, malfunctioning, and/or inoperable network device by enabling an OAM option included in an IP packet to be used by the network device to facilitate diagnostics concerning the network device. For example, the network device, based on the OAM option, may log information concerning the IP packet, send an ICMP OAM message concerning the packet to an originator of the IP packet, or send telemetry information concerning the IP packet to the monitoring device. This provides information relating to the IP packet and the network device that can be used to diagnose issues concerning the network device and/or the network. This allows the issues to be quickly addressed, which reduces an amount of time that the network device is underperforming, malfunctioning, and/or inoperable. This can result in more efficient operation of the network.

Figure 1B:
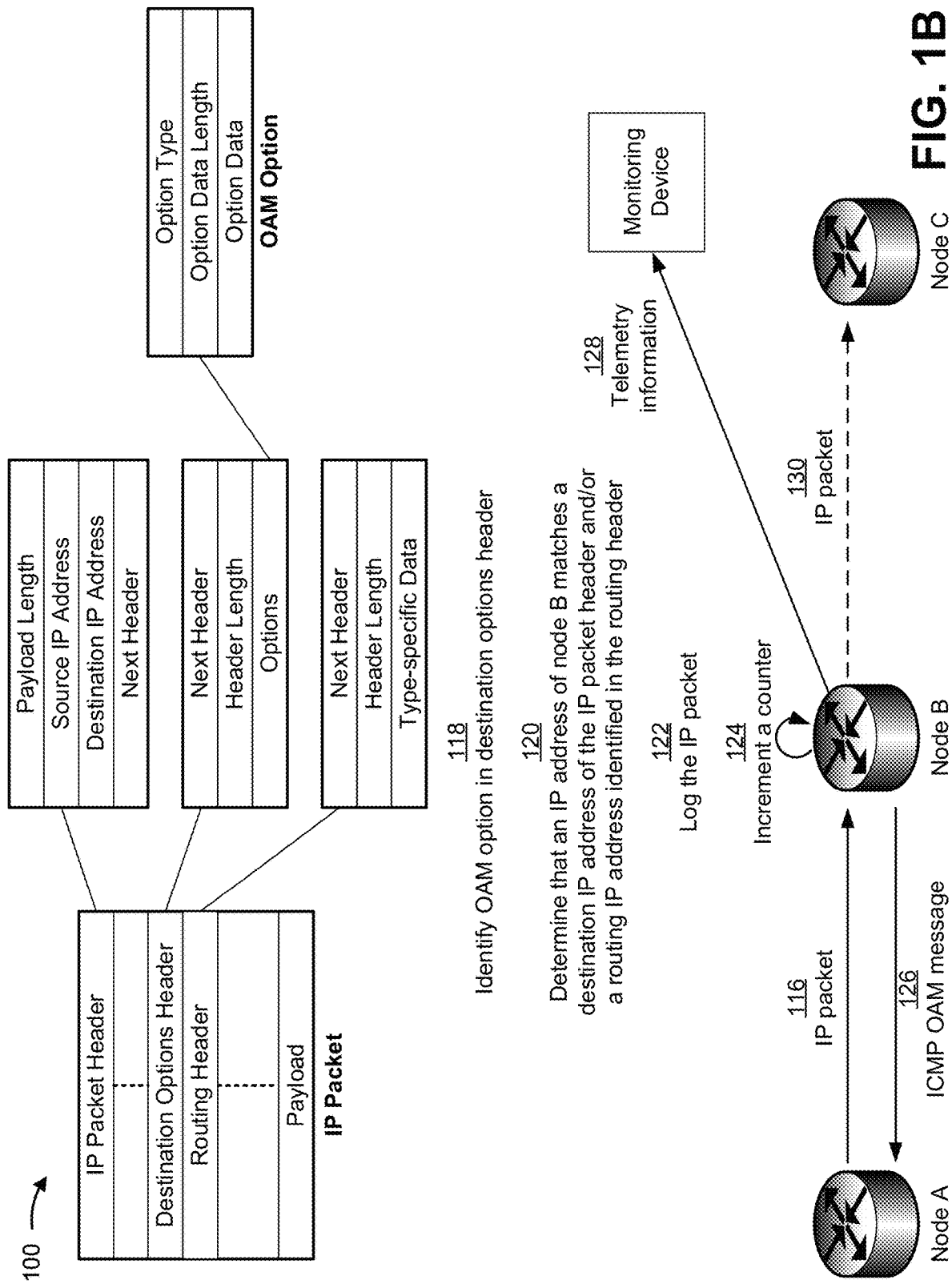

FIGS. 1A-1C are diagrams of one or more example implementations 100 described herein. For example, example implementation(s) 100 may include one or more peer devices (not shown), one or more network devices (shown as Nodes A-C) that are part of a network, and a monitoring device. The one or more network devices may route an Internet Protocol (IP) packet (e.g., a packet that conforms to IP version 6 (IPv6) or a later version) from a first peer device through the network to a second peer device.

An IP packet may include an IP packet header and a payload. The IP packet header may include one or more fields, such as a payload length field that indicates a length of the payload, a source IP address that indicates an originator of the IP packet (e.g., an IP address of a peer device and/or a network device that generates and sends the IP packet), a destination IP address that indicates an intended recipient of the IP packet (e.g., an IP address of a peer device and/or a network device that ultimately receives the IP packet), a next header field that identifies a type of the header following the IP packet header (e.g., an extension header, an upper-layer header, and/or the like), and/or the like.

The IP packet header may be followed by one or more extension headers and/or an upper-layer header in the IP packet. The one or more extension headers may include a hop-by-hop options header, a destination options header, a routing header, and/or the like. The one or more extension headers may appear in any order after the IP packet header and before the upper-layer header. A hop-by-hop options header may indicate an option, such as an Operations and Management capabilities (OAM) option described herein, that is to be processed by each network device that receives the IP packet and that is configured to read and process the hop-by-hop header. A destination options header that precedes a routing header may include an option, such as the OAM option described herein, that is to be processed by a network device if an IP address of the network device matches the destination IP address in the IP packet header and/or the IP address of the network device matches a routing IP address, of one or more routing IP addresses, identified in the routing header. Additionally, or alternatively, a destination options header that precedes the upper-layer header may include an option, such as the OAM option described herein, that is to be processed by a network device if an IP address of the network device matches the destination IP address in the IP packet header.

As shown in FIG. 1A and by reference number 102, a first network device (shown as Node A) may send an IP packet to a second network device (shown as Node B) within the network and/or the second network device may obtain the IP packet from the first network device. The first network device may be an originator of the IP packet and/or an intermediary network device that routes the IP packet to the second network device. As shown in FIG. 1A, the IP packet may include an IP packet header, a hop-by-hop header, and a payload. The hop-by-hop header may include one or more fields, such as a next header field that identifies a type of the header following the hop-by-hop header, a hop-by-hop header length field that indicates a length of the hop-by-hop header, an options field that indicates one or more options, such as the OAM option described herein, and/or the like.

As shown in FIG. 1A, the OAM option may comprise an option type field that indicates that the type of the OAM option is an OAM option type, an option data length field that indicates a length of an option data field of the OAM option, and the option data field that indicates one or more actions described herein (see FIG. 2 and accompany description herein). In some implementations, the option type field may comprise a plurality of bits, such as eight bits; the option data length field may comprise a plurality of bits, such as eight bits; the option data field may comprise a plurality of bits, such as sixteen bits; and/or the like. In some implementations, one or more bits of the plurality of bits of the option type field (e.g., the two highest-order bits of the option type field) may indicate to a particular network device (e.g., that does not recognize the option type field) that the particular network device is to skip over the option type field and continue processing the header that includes the OAM option (e.g., the hop-by-hop header). In some implementations, a bit, of the plurality of bits of the option type field (e.g., the third highest-order bit of the option type field), may indicate that data in the option data field cannot be changed by a network device.

As shown by reference number 104, the second network device may identify the OAM option in the hop-by-hop header. For example, the second network device may parse the hop-by-hop header to determine that the hop-by-hop header includes the OAM option in the options field of the hop-by-hop header.

Because the OAM option is included in the hop-by-hop header, the second network device may process the OAM option regardless of the destination IP address included in the IP packet header or any other information included in other headers of the IP packet. In some implementations, the second network device may process the OAM option to determine the one or more actions indicated by the option data field. The one or more actions may include logging the IP packet, incrementing a counter associated with the second network device, sending an Internet Control Message Protocol (ICMP) OAM message (e.g., a message that conforms to ICMP version 6 (ICMPv6)) to the source IP address included in the IP packet header, sending telemetry information concerning the IP packet to the monitoring device, and/or the like.

As shown by reference number 106, if the option data field of the OAM option indicates logging the IP packet, the second network device may log the IP packet. For example, the second network device may generate a record indicating a time at which the record was generated and a time that the second network device received the IP packet. The second network device may send the record to a data structure to be saved in the data structure. The data structure may be accessible by the second network device, any other network device, a peer device, the monitoring device, and/or the like. As shown by reference number 108, if the option data field of the OAM option indicates incrementing a counter, the second network device may increment a counter associated with the second network device. In this way, the second network device may count and keep track of the IP packet any other IP packets processed by the second network device.

As shown by reference number 110, if the option data field of the OAM option indicates sending an ICMP OAM message, the second network device may generate and send an ICMP OAM message to the source IP address included in the IP packet header (shown in FIG. 1A as Node A, the first network device). The ICMP OAM message may include one or more fields, such as a code field, an original datagram field, and/or the like (see FIG. 3 and accompany description herein). The code field may indicate that the ICMP OAM message is an informational message, that the ICMP OAM message is not an error message, and/or the like. The original datagram field may include the IP packet, or as much of the IP packet that fits in a maximum transmission unit (MTU) that can be transmitted over a link by the second network device (e.g., 1,280 bytes for an IP MTU). The original datagram field may include the IP packet zero-padded to a particular bit boundary (e.g., a thirty-two bit boundary).

As shown by reference number 112, if the option data field of the OAM option indicates sending telemetry information, the second network device may send telemetry information concerning the IP packet to a monitoring device. The telemetry information may include the IP packet and/or may indicate a time at which the second network device received the IP packet. The monitoring device may analyze the telemetry information to determine a performance issue related to the second network device, one or more additional network devices, the network, and/or the like.

As shown by reference number 114, in implementations when the second network device is not the intended recipient of the IP packet, the second network device may transmit the IP packet to a third network device (shown in FIG. 1A as Node C). The second network device may transmit the IP packet to the third network device based on the IP packet header, the routing header, the upper-layer header, and/or the like. Additionally, or alternatively, in implementations when the second network device is unable to transmit the IP packet (e.g., the second network device does not maintain a route, in a routing table of the second network device, to the intended recipient of the IP packet), the second network device may, after and/or in parallel with processing the OAM option and performing the one or more actions, discard the IP packet and/or send an error message (e.g., an ICMP destination unreachable message) to the originator of the IP packet.

As shown in FIG. 1B and by reference number 116, the first network device may send a different IP packet to the second network device within the network and/or the second network device may obtain the different IP packet from the first network device in a similar manner as described herein in relation to FIG. 1A. As shown in FIG. 1B, the different IP packet may include an IP packet header, a destinations options header that precedes a routing header, and a payload. The destinations options header may include one or more fields, such as a next header field that identifies a type of the header following the destinations options header (e.g., a routing header type), a destinations options header length field that indicates a length of the destination options header, an options field that indicates one or more options, such as the OAM option described herein, and/or the like. The routing header may include one or more fields, such as a next header field that identifies a type of the header following the routing header, a routing header length field that indicates a length of the routing header, a type-specific data field that indicates one or more routing IP addresses (e.g., one or more network devices that the IP packet is to route to while routing through the network), and/or the like.

As shown by reference number 118, the second network device may identify the OAM option in the destination options header of the IP packet in a similar manner as described herein in relation to FIG. 1A. For example, the second network device may parse the destination options header to determine that the destination options header includes the OAM option in the options field of the destination options header.

Because the OAM option is included in the destination options header that precedes the routing header, the second network device may process the OAM option only if an IP address of the second network device matches the destination IP address in the IP packet header and/or the IP address of the network device matches a routing IP address, of the one or more routing IP addresses, identified in the routing header. Accordingly, in some implementations, the second network device may determine the IP address of the second network device and may determine whether the IP address of the second network matches the destination IP address and/or the routing IP address. If the second network device determines that the IP address of the second network device does not match the destination IP address and/or the routing IP address, the second network device may not process the OAM option. Additionally, or alternatively, as shown in reference number 120, if the second network device determines that the IP address of the second network device matches the destination IP address and/or the routing IP address, the second network device may process the OAM option to determine the one or more actions indicated by the option data field of the OAM option.

As shown by reference number 122, if the option data field of the OAM option indicates logging the IP packet, the second network device may log the IP packet in a similar manner as described herein in relation to FIG. 1A. As shown by reference number 124, if the option data field of the OAM option indicates incrementing a counter, the second network device may increment a counter associated with the second network device in a similar manner as described herein in relation to FIG. 1A. As shown by reference number 126, if the option data field of the OAM option indicates sending an ICMP OAM message, the second network device may generate and send an ICMP OAM message to the source IP address included in the IP packet header (shown in FIG. 1B as Node A, the first network device) in a similar manner as described herein in relation to FIG. 1A. As shown by reference number 128, if the option data field of the OAM option indicates sending telemetry information, the second network device may send telemetry information concerning the IP packet to the monitoring device in a similar manner as described herein in relation to FIG. 1A.

As shown by reference number 130, in implementations when the second network device is not the intended recipient of the IP packet, the second network device may transmit the IP packet to the third network device (shown in FIG. 1B as Node C) in a similar manner as described herein in relation to FIG. 1A. The second network device may transmit the IP packet to the third network device based on the IP packet header, the routing header, the upper-layer header, and/or the like. Additionally, or alternatively, in implementations when the second network device is unable to transmit the IP packet (e.g., the second network device does not maintain a route, in a routing table of the second network device, to the intended recipient of the IP packet), the second network device may, after and/or in parallel with processing the OAM option and performing the one or more actions, discard the IP packet and/or send an error message (e.g., an ICMP destination unreachable message) to the originator of the IP packet.

As shown in FIG. 1C and by reference number 132, the first network device may send an additional IP packet to the second network device within the network and/or the second network device may obtain the additional IP packet from the first network device in a similar manner as described herein in relation to FIGS. 1A and 1B. As shown in FIG. 1C, this IP packet may include an IP packet header, a destinations options header that precedes an upper-layer header, and a payload. The destinations options header may include one or more fields, such as a next header field that identifies a type of the header following the destinations options header (e.g., an upper-layer header type), a destinations options header length field that indicates a length of the destinations options header, an options field that indicates one or more options, such as the OAM option described herein, and/or the like. The upper-layer header may include one or more fields, such as a next header field that identifies a type of the header following the upper-layer header, an upper-layer header length field that indicates a length of the routing header, a type-specific data field that indicates upper-layer information, and/or the like.

As shown by reference number 134, the second network device may identify the OAM option in the destination options header of the IP packet in a similar manner as described herein in relation to FIGS. 1A and 1B. For example, the second network device may parse the destination options header to determine that the destination options header includes the OAM option in the options field of the destination options header.

Because the OAM option is included in the destination options header that precedes the upper-layer header, the second network device may process the OAM option only if an IP address of the second network device matches the destination IP address in the IP packet header. Accordingly, in some implementations, the second network device may determine the IP address of the second network device and may determine whether the IP address of the second network matches the destination IP address. If the second network device determines that the IP address of the second network device does not match the destination IP address, the second device may not process the OAM option. Additionally, or alternatively, as shown in reference number 136, if the second network device determines that the IP address of the second network device matches the destination IP address, the second device may process the OAM option to determine the one or more actions indicated by the option data field of the OAM option.

As shown by reference number 138, if the option data field of the OAM option indicates logging the IP packet, the second network device may log the IP packet in a similar manner as described herein in relation to FIGS. 1A and 1B. As shown by reference number 140, if the option data field of the OAM option indicates incrementing a counter, the second network device may increment a counter associated with the second network device in a similar manner as described herein in relation to FIGS. 1A and 1B. As shown by reference number 142, if the option data field of the OAM option indicates sending an ICMP OAM message, the second network device may generate and send an ICMP OAM message to the source IP address included in the IP packet header (shown in FIG. 1C as Node A, the first network device) in a similar manner as described herein in relation to FIGS. 1A and 1B. As shown by reference number 144, if the option data field of the OAM option indicates sending telemetry information, the second network device may send telemetry information concerning the IP packet to the monitoring device in a similar manner as described herein in relation to FIGS. 1A and 1B.

As shown in FIG. 1C, the second network device is the intended recipient of the IP packet, so the second network device does not transmit the IP packet to any other network device in this situation.

As indicated above, FIGS. 1A-1C are provided by way of example. Other examples may differ from what is described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple and/or distributed devices. Additionally, or alternatively, a set of devices (e.g., one or more devices) of example implementation(s) 100 may perform one or more functions described as being performed by another set of devices of example implementation(s) 100.

FIG. 2 is a diagram of example option data field bits, of an example Operations and Management capabilities (OAM) option 200, mapped to the one or more actions described herein (e.g., the option data field is a bit mask that indicates the one or more actions). For example, as shown in FIG. 2, a bit in the "0" position of the option data field may indicate a "log the packet" action (e.g., log the IP packet, as described herein) to be performed by a network device. The bit in the "1" position may indicate a "count the packet" action (e.g., increment a counter associated with the network device, as described herein) to be performed by the network device. The bit in the "2" position may indicate a "send an ICMPv6 OAM" action (e.g., send an ICMP OAM message to a source address included in an IP packet header of the IP packet, as described herein) to be performed by the network device. The bit in the "3" position may indicate a "send telemetry" action (e.g., send telemetry information concerning the IP packet to a monitoring device, as described here) to be performed by the network device. The bits in the "4-15" positions may be reserved for additional actions.

As indicated above, FIG. 2 is provided by way of example. Other examples may differ from what is described with regard to FIG. 2. For example, there may be additional fields and/or actions, fewer fields and/or actions, different fields and/or actions, or differently arranged fields and/or actions than those shown in FIG. 2.

Figure 3:
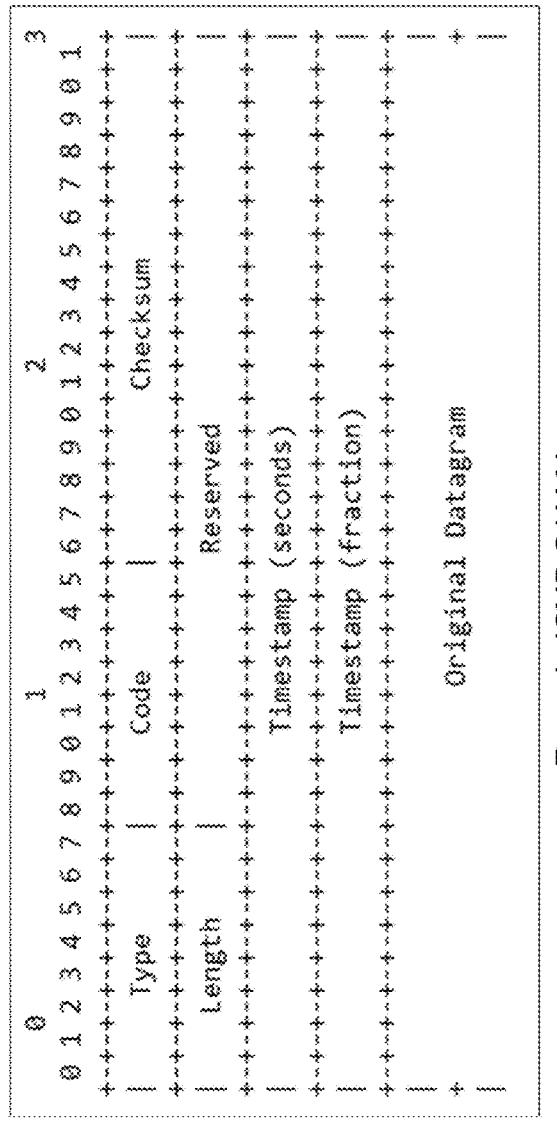
FIG. 3 is a diagram of an example Internet Control Message Protocol (ICMP) OAM message format.

FIG. 3 is a diagram of an example Internet Control Message Protocol (ICMP) OAM message 300. As shown in FIG. 3, OAM message 300 may include one or more fields, such as a type field, a code field, a checksum field, a length field, a reserved field, a timestamp in seconds field, a timestamp in fractions of a second field, an original datagram field, and/or the like. The type field may be eight bits long and may indicate that the type of the ICMP OAM message is an ICMP OAM message type. The code field may be eight bits long and may indicate that the ICMP OAM message is an informational message, that the ICMP OAM message is not an error message, and/or the like (e.g., the code field may be set to zero).

The checksum field may be sixteen bits long and may indicate a checksum related to the ICMP OAM message (e.g., the checksum may be a sixteen bit one's complement of the one's complement sum of the entire ICMP OAM message). The checksum field may be used to detect data corruption in the ICMP OAM message. The length field may be eight bits long and may indicate a length of the original datagram field. The length may be measured in thirty-two bit words. The reserved field may be twenty-four bits long and may be set to zero so that a network device ignores the reserved field.

The timestamp in seconds field may be thirty-two bits long and may indicate a time (e.g., in seconds), in a network time protocol (NTP) format, at which the network device received the IP packet. The timestamp in fractions of a second field may be thirty-two bits long and may indicate a time, in fractions of a second according to the NTP format, at which the network device received the IP packet. The original datagram field may have a size that is a multiple of thirty-two bits. The original datagram field may include the IP packet, or as much of the IP packet that fits in a maximum transmission unit (MTU) that can be transmitted over a link by the second network device (e.g., 1,280 bytes for an IP MTU). The original datagram field may include the IP packet zero-padded to a particular bit boundary (e.g., a thirty-two bit boundary).

As indicated above, FIG. 3 is provided by way of example. Other examples may differ from what is described with regard to FIG. 3. For example, there may be additional fields and/or values, fewer fields and/or values, different fields and/or values, or differently arranged fields and/or values than those shown in FIG. 3.

Figure 4:
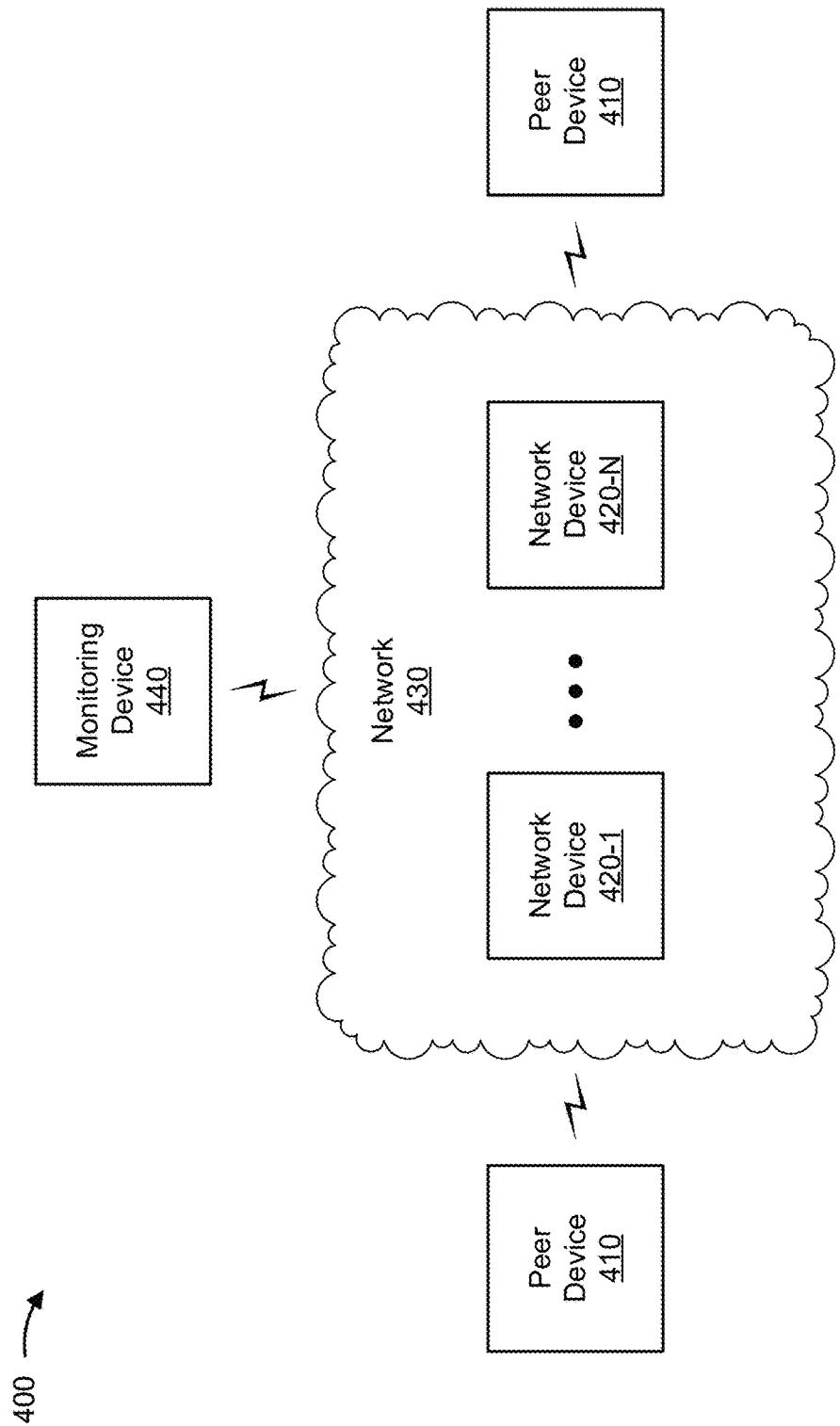
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more peer devices 410, a group of network devices 420 (shown as network device 420-1 through network device 420-N), a network 430, and a monitoring device 440. Devices of environment 400 may interconnect via wired connections, wireless connections, or a combination of wired and wireless connections.

Peer device 410 includes one or more devices capable of receiving and/or providing network traffic. For example, peer device 410 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 410 may include an endpoint device that is a source or a destination for network traffic. For example, peer device 410 may include a computer or a similar type of device. Peer device 410 may receive network traffic from and/or may provide network traffic (e.g., IP packets) to other peer devices 410 via network 430 (e.g., by routing IP packets using network device(s) 420 as an intermediary). In some implementations, peer device 410 may include an edge device that is located at an edge of one or more networks. For example, peer device 410 receive network traffic from and/or may provide network traffic (e.g., IP packets) to devices external to network 430.

Network device 420 includes one or more devices capable of receiving, processing, storing, routing, and/or providing traffic (e.g., an IP packet, an ICMP OAM message, telemetry information, etc.) in a manner described herein. For example, network device 420 may include a router, such as a label switching router (LSR), a label edge router (LER), an ingress router, an egress router, a provider router (e.g., a provider edge router, a provider core router, etc.), a virtual router, and/or the like. Additionally, or alternatively, network device 420 may include a gateway, a switch, a firewall, a hub, a bridge, a reverse proxy, a server (e.g., a proxy server, a cloud server, a data center server, etc.), a load balancer, and/or a similar device.

In some implementations, network device 420 may be a physical device implemented within a housing, such as a chassis. In some implementations, network device 420 may be a virtual device implemented by one or more computer devices of a cloud computing environment or a data center.

In some implementations, network device 420 may receive an IP packet from peer device 410. In some implementations, network device 420 may route the IP packet to another network device 420, using one or more techniques described elsewhere herein. In some implementations, network device 420 may be an edge network device in network 430. In some implementations, network device 420 may be an intermediary network device in network 430 (i.e., a network device between two or more edge network devices).

Network 430 includes one or more wired and/or wireless networks. For example, network 430 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Monitoring device 440 includes one or more devices capable of storing, processing, and/or routing information associated with telemetry information. For example, monitoring device 440 may include a server device that includes computing resources that may be utilized in connection with routing information associated with the telemetry information. In some implementations, monitoring device 440 may include a communication interface that allows monitoring device 440 to receive information from and/or transmit information to other devices in environment 400, such as one or more peer devices 410 and/or one or more network devices 420.

The number and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5A:
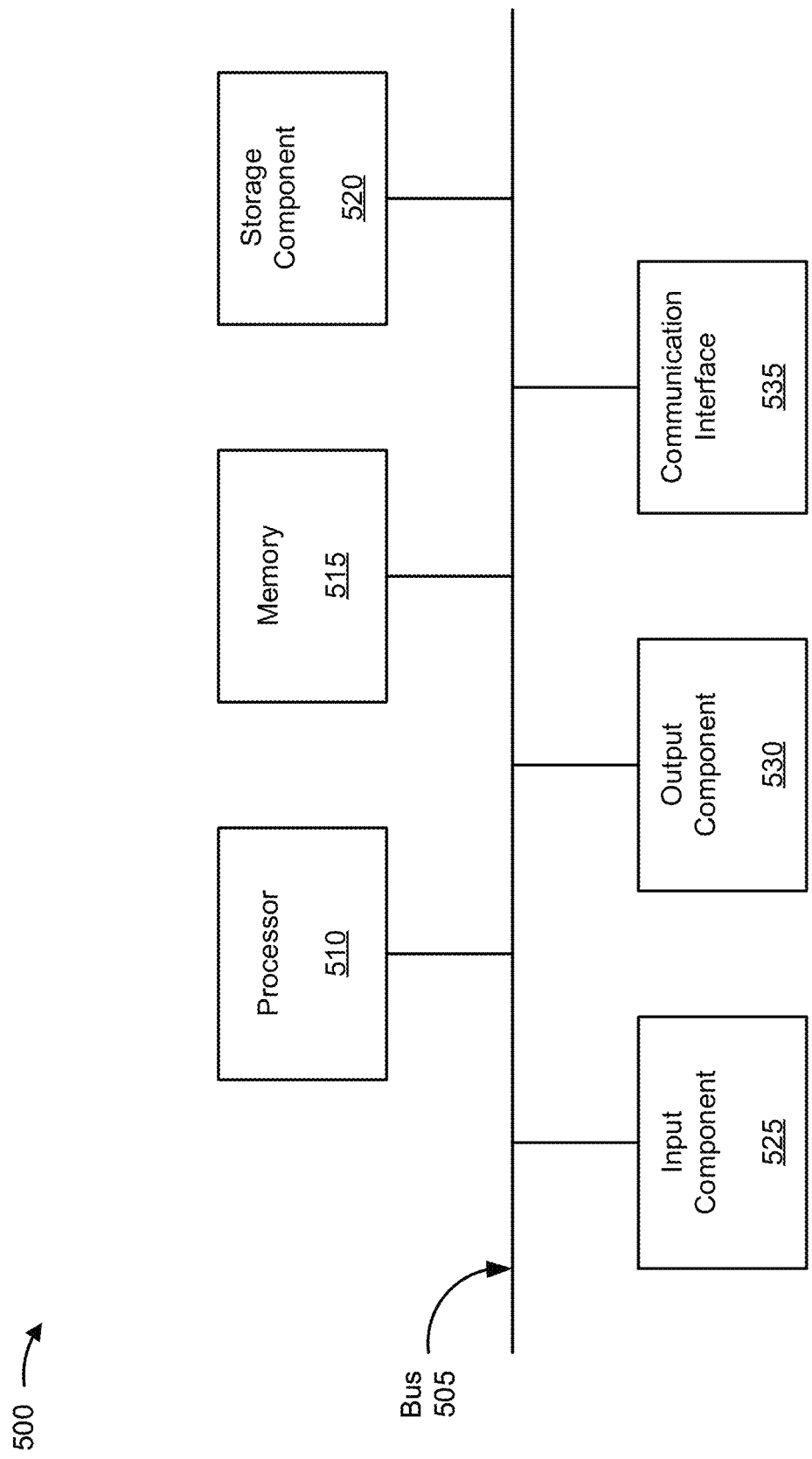
FIGS. 5A and 5B are diagrams of example components of one or more devices of FIG. 4.
Figure 5B:
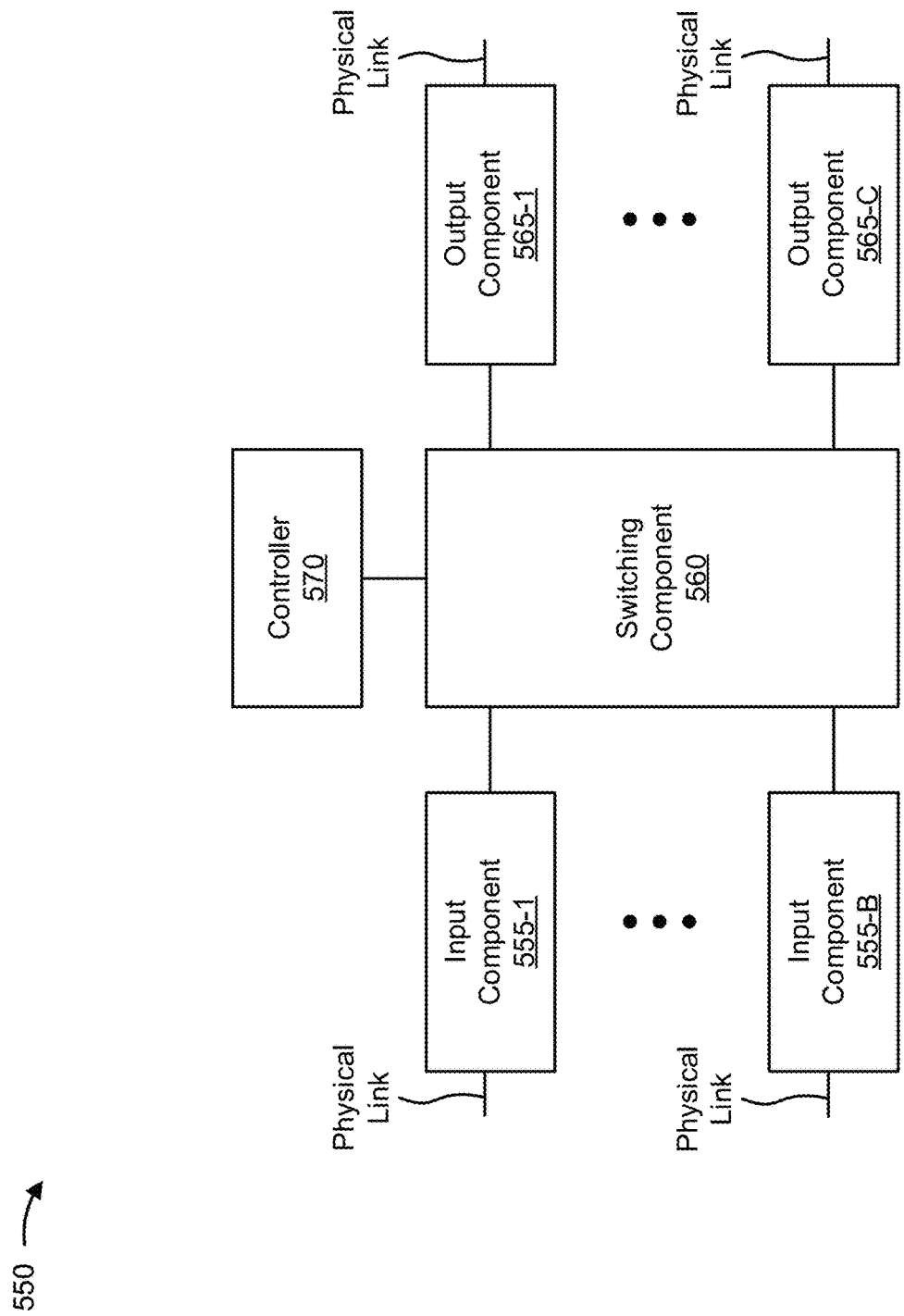

FIGS. 5A-5B are diagrams of example components of one or more devices of FIG. 4. FIG. 5A is a diagram of example components of a device 500. Device 500 may correspond to peer device 410, network device 420, and/or monitoring device 440. In some implementations, peer device 410, network device 420, and/or monitoring device may include one or more devices 500 and/or one or more components of device 500. As shown in FIG. 5A, device 500 may include a bus 505, a processor 510, a memory 515, a storage component 520, an input component 525, an output component 530, and a communication interface 535.

Bus 505 includes a component that permits communication among the components of device 500. Processor 510 is implemented in hardware, firmware, or a combination of hardware and software. Processor 510 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 510 includes one or more processors capable of being programmed to perform a function. Memory 515 includes a random access memory (RAM), a read only memory (ROM), and/or another type of dynamic or static storage device (e.g., a flash memory, a magnetic memory, and/or an optical memory) that stores information and/or instructions for use by processor 510.

Storage component 520 stores information and/or software related to the operation and use of device 500. For example, storage component 520 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 525 includes a component that permits device 500 to receive information, such as via user input (e.g., a touch screen display, a keyboard, a keypad, a mouse, a button, a switch, and/or a microphone). Additionally, or alternatively, input component 525 may include a sensor for sensing information (e.g., a global positioning system (GPS) component, an accelerometer, a gyroscope, and/or an actuator). Output component 530 includes a component that provides output information from device 500 (e.g., a display, a speaker, and/or one or more light-emitting diodes (LEDs)).

Communication interface 535 includes a transceiver-like component (e.g., a transceiver and/or a separate receiver and transmitter) that enables device 500 to communicate with other devices, such as via a wired connection, a wireless connection, or a combination of wired and wireless connections. Communication interface 535 may permit device 500 to receive information from another device and/or provide information to another device. For example, communication interface 535 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes based on processor 510 executing software instructions stored by a non-transitory computer-readable medium, such as memory 515 and/or storage component 520. A computer-readable medium is defined herein as a non-transitory memory device. A memory device includes memory space within a single physical storage device or memory space spread across multiple physical storage devices.

Software instructions may be read into memory 515 and/or storage component 520 from another computer-readable medium or from another device via communication interface 535. When executed, software instructions stored in memory 515 and/or storage component 520 may cause processor 510 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5A are provided as an example. In practice, device 500 may include additional components, fewer components, different components, or differently arranged components than those shown in FIG. 5A. Additionally, or alternatively, a set of components (e.g., one or more components) of device 500 may perform one or more functions described as being performed by another set of components of device 500.

FIG. 5B is a diagram of example components of a device 550. Device 550 may correspond to network device 420. In some implementations, network device 420 may include one or more devices 550 and/or one or more components of device 550. As shown in FIG. 5B, device 550 may include one or more input components 555-1 through 555-B (B≥1) (hereinafter referred to collectively as input components 555, and individually as input component 555), a switching component 560, one or more output components 565-1 through 565-C (C≥1) (hereinafter referred to collectively as output components 565, and individually as output component 565), and a controller 570.

Input component 555 may be points of attachment for physical links and may be points of entry for incoming traffic, such as packets (e.g., IP packets). Input component 555 may process incoming traffic, such as by performing data link layer encapsulation or decapsulation. In some implementations, input component 555 may send and/or receive packets. In some implementations, input component 555 may include an input line card that includes one or more packet processing components (e.g., in the form of integrated circuits), such as one or more interface cards (IFCs), packet forwarding components, line card controller components, input ports, processors, memories, and/or input queues. In some implementations, device 550 may include one or more input components 555.

Switching component 560 may interconnect input components 555 with output components 565. In some implementations, switching component 560 may be implemented via one or more crossbars, via busses, and/or with shared memories. The shared memories may act as temporary buffers to store packets from input components 555 before the packets are eventually scheduled for delivery to output components 565. In some implementations, switching component 560 may enable input components 555, output components 565, and/or controller 570 to communicate.

Output component 565 may store packets and may schedule packets for transmission on output physical links. Output component 565 may support data link layer encapsulation or decapsulation, and/or a variety of higher-level protocols. In some implementations, output component 565 may send packets and/or receive packets. In some implementations, output component 565 may include an output line card that includes one or more packet processing components (e.g., in the form of integrated circuits), such as one or more IFCs, packet forwarding components, line card controller components, output ports, processors, memories, and/or output queues. In some implementations, device 550 may include one or more output components 565. In some implementations, input component 555 and output component 565 may be implemented by the same set of components (e.g., and input/output component may be a combination of input component 555 and output component 565).

Controller 570 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 570 may include one or more processors that can be programmed to perform a function.

In some implementations, controller 570 may include a RAM, a ROM, and/or another type of dynamic or static storage device (e.g., a flash memory, a magnetic memory, an optical memory, etc.) that stores information and/or instructions for use by controller 570.

In some implementations, controller 570 may communicate with other devices, networks, and/or systems connected to device 500 to exchange information regarding network topology. Controller 570 may create routing tables based on the network topology information, create forwarding tables based on the routing tables, and forward the forwarding tables to input components 555 and/or output components 565. Input components 555 and/or output components 565 may use the forwarding tables to perform route lookups for incoming and/or outgoing packets.

Controller 570 may perform one or more processes described herein. Controller 570 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 570 from another computer-readable medium or from another device via a communication interface. When executed, software instructions stored in a memory and/or storage component associated with controller 570 may cause controller 570 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5B are provided as an example. In practice, device 550 may include additional components, fewer components, different components, or differently arranged components than those shown in FIG. 5B. Additionally, or alternatively, a set of components (e.g., one or more components) of device 550 may perform one or more functions described as being performed by another set of components of device 550.

FIG. 6 is a flow chart of an example process 600 for an IP OAM option. In some implementations, one or more process blocks of FIG. 6 may be performed by a network device (e.g., network device 420). In some implementations, one or more process blocks of FIG. 6 may be performed by another device or a group of devices separate from or including the network device, such as a peer device (e.g., peer device 410), a monitoring device (e.g., monitoring device 440), and/or the like.

As shown in FIG. 6, process 600 may include receiving an internet protocol (IP) packet that includes an IP packet header, wherein the IP packet header includes a destination IP address, wherein the IP packet header is supplemented with at least one extension header, which includes at least one of: a hop-by-hop options header, a first destination options header that precedes a routing header, or a second destination options header that precedes an upper-layer header (block 610). For example, the network device (e.g., using processor 510, memory 515, storage component 520, input component 525, output component 530, communication interface 535, input component 555, switching component 560, output component 565, controller 570, and/or the like) may receive, by a network device, an internet protocol (IP) packet that includes an IP packet header, as described above. In some implementations, the IP packet header includes a destination IP address. In some implementations, the IP packet header is supplemented with at least one extension header, which includes at least one of: a hop-by-hop options header, a first destination options header that precedes a routing header, or a second destination options header that precedes an upper-layer header.

As further shown in FIG. 6, process 600 may include determining that the hop-by-hop options header includes an Operations and Management capabilities (OAM) option, the first destination options header includes the OAM option and an IP address of the network device matches the destination IP address or a routing IP address identified in the routing header, or the second destination options header includes the OAM option and the IP address of the network device matches the destination IP address (block 620). For example, the network device (e.g., using processor 510, memory 515, storage component 520, input component 525, output component 530, communication interface 535, input component 555, switching component 560, output component 565, controller 570, and/or the like) may determine that the hop-by-hop options header includes an Operations and Management capabilities (OAM) option, the first destination options header includes the OAM option and an IP address of the network device matches the destination IP address or a routing IP address identified in the routing header, or the second destination options header includes the OAM option and the IP address of the network device matches the destination IP address, as described above.

As further shown in FIG. 6, process 600 may include performing one or more actions indicated by the OAM option (block 630). For example, the network device (e.g., using processor 510, memory 515, storage component 520, input component 525, output component 530, communication interface 535, input component 555, switching component 560, output component 565, controller 570, and/or the like) may perform one or more actions indicated by the OAM option, as described above.

Process 600 may include additional implementations, such as any single implementation or any combination of implementations described below and/or in connection with one or more other processes described elsewhere herein.

In some implementations, the OAM option comprises an option type field that indicates the OAM option, an option data length field that indicates a length of an option data field of the OAM option, and the option data field that indicates the one or more actions. In some implementations, the OAM option comprises an option data field that indicates the one or more actions.

In some implementations, the one or more actions include at least one of: logging the IP packet, incrementing a counter associated with the network device, sending an ICMP OAM message to a source IP address included in the IP packet header, or sending telemetry information concerning the IP packet to a monitoring device.

In some implementations, the one or more actions include sending an ICMP OAM message to a source IP address included in the IP packet header. In some implementations, the ICMP OAM message comprises a type field; a code field; a checksum field; a length field; a reserved field; a timestamp in seconds field; a timestamp in fractions of a second field; and an original datagram field.

In some implementations, the one or more actions include sending an ICMP OAM message to a source IP address included in the IP packet header. In some implementations, the ICMP OAM message comprises a code field that indicates that the ICMP OAM message is an informational message.

In some implementations, the one or more actions include sending an ICMP OAM message to a source IP address included in the IP packet header. In some implementations, the ICMP OAM message comprises an original datagram field that includes the IP packet.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
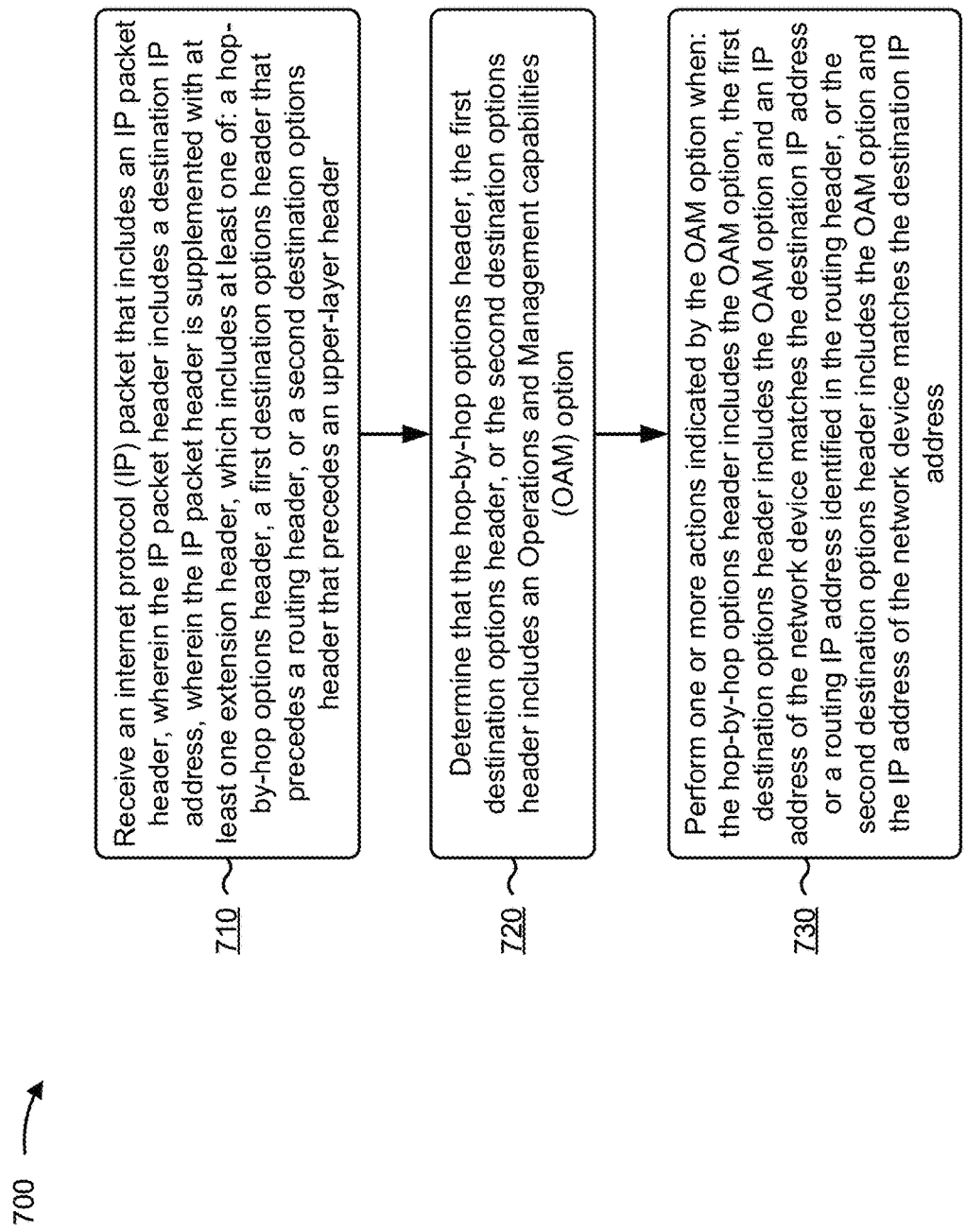

FIG. 7 is a flow chart of an example process 700 for an IP OAM option. In some implementations, one or more process blocks of FIG. 7 may be performed by network device (e.g., network device 420). In some implementations, one or more process blocks of FIG. 7 may be performed by another device or a group of devices separate from or including the network device, such as a peer device (e.g., peer device 410), a monitoring device (e.g., monitoring device 440), and/or the like.

As shown in FIG. 7, process 700 may include receiving an internet protocol (IP) packet that includes an IP packet header, wherein the IP packet header includes a destination IP address, wherein the IP packet header is supplemented with at least one extension header, which includes at least one of: a hop-by-hop options header, a first destination options header that precedes a routing header, or and a second destination options header that precedes an upper-layer header (block 710). For example, the network device (e.g., using processor 510, memory 515, storage component 520, input component 525, output component 530, communication interface 535, input component 555, switching component 560, output component 565, controller 570, and/or the like) may receive an internet protocol (IP) packet that includes an IP packet header, as described above. In some implementations, the IP packet header includes a destination IP address. In some implementations, the IP packet header is supplemented with at least one extension header, which includes at least one of: a hop-by-hop options header, a first destination options header that precedes a routing header, or and a second destination options header that precedes an upper-layer header.

As further shown in FIG. 7, process 700 may include determining that the hop-by-hop options header, the first destination options header, or the second destination options header includes an Operations and Management capabilities (OAM) option (block 720). For example, the network device (e.g., using processor 510, memory 515, storage component 520, input component 525, output component 530, communication interface 535, input component 555, switching component 560, output component 565, controller 570, and/or the like) may determine that the hop-by-hop options header, the first destination options header, or the second destination options header includes an Operations and Management capabilities (OAM) option, as described above.

As further shown in FIG. 7, process 700 may include performing one or more actions indicated by the OAM option when: the hop-by-hop options header includes the OAM option, the first destination options header includes the OAM option and an IP address of the network device matches the destination IP address or a routing IP address identified in the routing header, or the second destination options header includes the OAM option and the IP address of the network device matches the destination IP address (block 730). For example, the network device (e.g., using processor 510, memory 515, storage component 520, input component 525, output component 530, communication interface 535, input component 555, switching component 560, output component 565, controller 570, and/or the like) may perform one or more actions indicated by the OAM option when: the hop-by-hop options header includes the OAM option, the first destination options header includes the OAM option and an IP address of the network device matches the destination IP address or a routing IP address identified in the routing header, or the second destination options header includes the OAM option and the IP address of the network device matches the destination IP address, as described above.

Process 700 may include additional implementations, such as any single implementation or any combination of implementations described below and/or in connection with one or more other processes described elsewhere herein.

In some implementations, the OAM option comprises an eight bit option type field, an eight bit option data length field, and a sixteen bit option data field. In some implementations, the OAM option comprises an option data field that indicates the one or more actions. In some implementations, the option data field comprises a plurality of bits, wherein a particular bit of the plurality of bits is associated with a particular action of the one or more actions.

In some implementations, the one or more actions includes logging the IP packet. In some implementations, when logging the IP packet, the network device may generate a record indicating a time that the record was generated and a time that the network device received the IP packet and may send the record to a data structure to be saved in the data structure. In some implementations, the one or more actions includes sending an ICMP OAM message to a source IP address included in the IP packet header. In some implementations, the ICMP OAM message comprises: an eight bit type field, an eight bit code field, a sixteen bit checksum field, an eight bit length field, a twenty-four bit reserved field, a thirty-two bit timestamp in seconds field, a thirty-two bit timestamp in fractions of a second field, and an original datagram field that has a size that is a multiple of thirty-two bits.

In some implementations, the one or more actions includes sending an ICMP OAM message to a source IP address included in the IP packet header. In some implementations, the ICMP OAM message comprises a code field that indicates that the ICMP OAM message is not an error message. In some implementations, the one or more actions includes sending an ICMP OAM message to a source IP address included in the IP packet header. In some implementations, the ICMP OAM message comprises a timestamp in seconds field. In some implementations, the timestamp in seconds field indicates a time, in a network time protocol (NTP) format, at which the network device received the IP packet. In some implementations, the one or more actions includes sending telemetry information concerning the IP packet to a monitoring device. In some implementations, the telemetry information includes the IP packet and indicates a time at which the network device received the IP packet.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
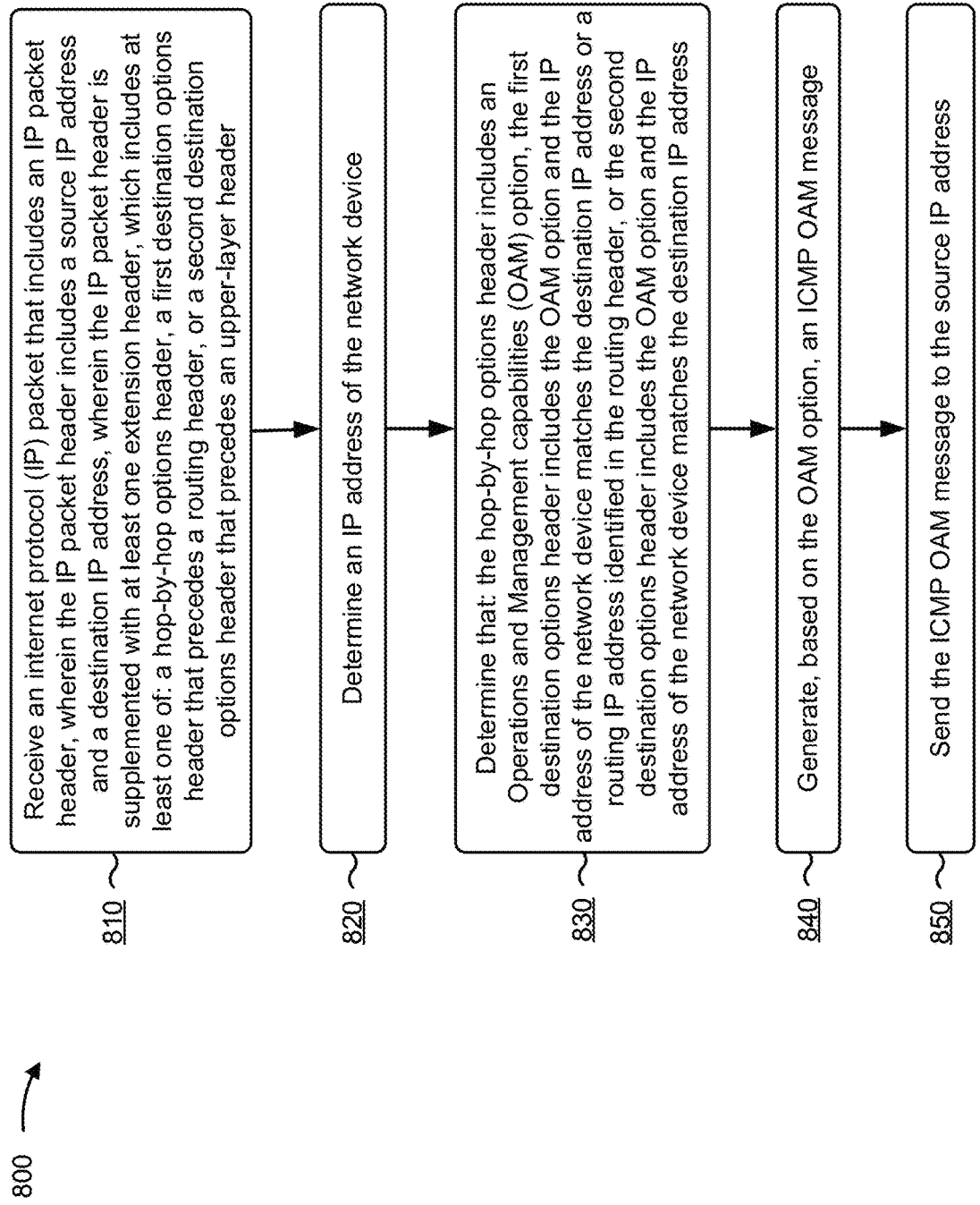

FIG. 8 is a flow chart of an example process 800 for an IP OAM option. In some implementations, one or more process blocks of FIG. 8 may be performed by a network device (e.g., network device 420). In some implementations, one or more process blocks of FIG. 8 may be performed by another device or a group of devices separate from or including the network device, such as a peer device (e.g., peer device 410), a monitoring device (e.g., monitoring device 440), and/or the like.

As shown in FIG. 8, process 800 may include receiving an internet protocol (IP) packet that includes an IP packet header, wherein the IP packet header includes a source IP address and a destination IP address, wherein the IP packet header is supplemented with at least one extension header, which includes at least one of: a hop-by-hop options header, a first destination options header that precedes a routing header, or a second destination options header that precedes an upper-layer header (block 810). For example, the network device (e.g., using processor 510, memory 515, storage component 520, input component 525, output component 530, communication interface 535, input component 555, switching component 560, output component 565, controller 570, and/or the like) may receive an internet protocol (IP) packet that includes an IP packet header, as described above. In some implementations, the IP packet header includes a source IP address and a destination IP address. In some implementations, the IP packet header is supplemented with at least one extension header, which includes at least one of: a hop-by-hop options header, a first destination options header that precedes a routing header, or a second destination options header that precedes an upper-layer header.

As further shown in FIG. 8, process 800 may include determining an IP address of the network device (block 820). For example, the network device (e.g., using processor 510, memory 515, storage component 520, input component 525, output component 530, communication interface 535, input component 555, switching component 560, output component 565, controller 570, and/or the like) may determine an IP address of the network device, as described above.

As further shown in FIG. 8, process 800 may include determining that: the hop-by-hop options header includes an Operations and Management capabilities (OAM) option, the first destination options header includes the OAM option and the IP address of the network device matches the destination IP address or a routing IP address identified in the routing header, or the second destination options header includes the OAM option and the IP address of the network device matches the destination IP address (block 830). For example, the network device (e.g., using processor 510, memory 515, storage component 520, input component 525, output component 530, communication interface 535, input component 555, switching component 560, output component 565, controller 570, and/or the like) may determine that: the hop-by-hop options header includes an Operations and Management capabilities (OAM) option, the first destination options header includes the OAM option and the IP address of the network device matches the destination IP address or a routing IP address identified in the routing header, or the second destination options header includes the OAM option and the IP address of the network device matches the destination IP address, as described above.

As further shown in FIG. 8, process 800 may include generating, based on the OAM option, an ICMP OAM message (block 840). For example, the network device (e.g., using processor 510, memory 515, storage component 520, input component 525, output component 530, communication interface 535, input component 555, switching component 560, output component 565, controller 570, and/or the like) may generate, based on the OAM option, an ICMP OAM message, as described above.

As further shown in FIG. 8, process 800 may include sending the ICMP OAM message to the source IP address (block 850). For example, the network device (e.g., using processor 510, memory 515, storage component 520, input component 525, output component 530, communication interface 535, input component 555, switching component 560, output component 565, controller 570, and/or the like) may send the ICMP OAM message to the source IP address, as described above.

Process 800 may include additional implementations, such as any single implementation or any combination of implementations described below and/or in connection with one or more other processes described elsewhere herein.

In some implementations, the OAM option comprises an option type field that comprises a plurality of bits. In some implementations, one or more bits, of the plurality of bits, indicate, to a particular network device that does not recognize the option type field, that: the particular network device is to skip over the option type field, and the particular network device is to continue processing the hop-by-hop options header, the first destination options header, or the second destination options header that includes the OAM option.

In some implementations, the ICMP OAM message comprises a length field and an original datagram field. In some implementations, the length field indicates a length of the original datagram field. In some implementations, the length is measured in thirty-two bit words.

In some implementations, the ICMP OAM message comprises a timestamp in seconds field and a timestamp in fractions of a second field. In some implementations, the timestamp in seconds field indicates a time, in seconds according to a network time protocol (NTP) format, at which the network device received the IP packet. In some implementations, the timestamp in fractions of a second field indicates a time, in fractions of a second according to the NTP format, at which the network device received the IP packet.

In some implementations, the ICMP OAM message comprises an original datagram field that includes the IP packet zero-padded to a nearest thirty-two bit boundary.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a network device and from a different network device that is not an intended recipient of an internet protocol (IP) packet, the IP packet that includes an IP packet header,
   wherein the IP packet header includes a destination IP address,
   wherein the IP packet header is supplemented with at least one extension header,
      wherein the at least one extension header includes an Operations and Management capabilities (OAM) option that indicates one or more actions to be performed by the network device,
   wherein the intended recipient is a particular network device to ultimately receive the IP packet and not transmit the IP packet to another network device, and
   wherein the different network device transmitted the IP packet to the network device without processing the OAM option based on the IP address of the different network device failing to match the destination IP address,
      wherein the different network device is to only process the OAM option based on determining the different network device is the intended recipient based on the IP address of the different network device matching the destination IP address;
   determining, by the network device, that the network device is the intended recipient and that the at least one extension header includes the OAM option based on parsing the at least one extension header,
      wherein determining that the at least one extension header includes the OAM option comprises one or more of:
         determining that a first destination options header, that precedes a routing header, includes the OAM option and determining that an IP address of the network device matches the destination IP address, or
         determining that a second destination options header, that precedes an upper-layer header, includes the OAM option and determining that the IP address of the network device matches the destination IP address, and
      wherein determining that the network device is the intended recipient based on the IP address of the network device matching the destination IP address;
   processing, by the network device and based on determining that the network device is the intended recipient and that the at least one extension header includes the OAM option, the OAM option to determine the one or more actions in a field of the OAM option; and
   performing, by the network device, the one or more actions identified in the OAM option based on processing the OAM option to determine the one or more actions in the field of the OAM option.

2. The method of claim 1, wherein the OAM option comprises an option type field that indicates the OAM option, an option data length field that indicates a length of an option data field of the OAM option, and the option data field that indicates the one or more actions.

3. The method of claim 1, wherein the OAM option comprises an option data field that indicates the one or more actions.

4. The method of claim 1, wherein the one or more actions include at least one of:
   logging an IP packet,
   incrementing a counter associated with the network device, sending an Internet Control Message Protocol (ICMP) OAM message to a source IP address included in the IP packet header, or sending telemetry information concerning the IP packet to a monitoring device.

5. The method of claim 1, wherein the one or more actions include sending an Internet Control Message Protocol (ICMP) OAM message to a source IP address included in the IP packet header, wherein the ICMP OAM message comprises:
a type field;
a code field;
a checksum field;
a length field;
a reserved field;
a timestamp in seconds field;
a timestamp in fractions of a second field; and
an original datagram field.

6. The method of claim 1, wherein the one or more actions include sending an Internet Control Message Protocol (ICMP) OAM message to a source IP address included in the IP packet header, wherein the ICMP OAM message comprises a code field that indicates that the ICMP OAM message is an informational message.

7. The method of claim 1, wherein the one or more actions include sending an Internet Control Message Protocol (ICMP) OAM message to a source IP address included in the IP packet header, wherein the ICMP OAM message comprises an original datagram field that includes the IP packet.

8. A network device, comprising:
one or more memories; and
one or more processors to:
  receive, from a different network device that is not an intended recipient of an internet protocol (IP) packet, the IP packet that includes an IP packet header,
    wherein the IP packet header includes a destination IP address,
    wherein the IP packet header is supplemented with at least one extension header,
      wherein the at least one extension header includes an Operation and Management capabilities (OAM) option that indicates one or more actions to be performed by the network device,
    wherein the intended recipient is a particular network device to ultimately receive the IP packet and not transmit the IP packet to another network device, and
    wherein the different network device transmitted the IP packet to the network device without processing the OAM option based on the IP address of the different network device failing to match the destination IP address;
  determine that the network device is the intended recipient and that the at least one extension header includes the OAM option based on parsing the at least one extension header,
    wherein the one or more processors, to determine that the at least one extension header includes the OAM option, are configured to one or more of:
      determine that a first destination options header, that precedes a routing header, includes the OAM option and determine that an IP address of the network device matches the destination IP address, or
      determine that a second destination options header, that precedes an upper-layer header, includes the OAM option and determine that the IP address of the network device matches the destination IP address;
  process, based on determining that the network device is the intended recipient and that the at least one extension header includes the OAM option, the OAM option to determine the one or more actions in a field of the OAM option; and
  perform the one or more actions identified in the OAM option based on processing the OAM option to determine the one or more actions in the field of the OAM option.

9. The network device of claim 8, wherein the OAM option comprises an eight bit option type field, an eight bit option data length field, and a sixteen bit option data field.

10. The network device of claim 8, wherein the OAM option comprises an option data field that indicates the one or more actions, wherein the option data field comprises a plurality of bits, and wherein a particular bit of the plurality of bits is associated with a particular action of the one or more actions.

11. The network device of claim 8, wherein the one or more actions includes logging IP packet, wherein the one or more processors, when logging the IP packet, are further to:
  generate a record indicating a time that the record was generated and a time that the network device received the IP packet; and
  send the record to a data structure to be saved in the data structure.

12. The network device of claim 8, wherein the one or more actions includes sending an Internet Control Message Protocol (ICMP) OAM message to a source IP address included in the IP packet header, wherein the ICMP OAM message comprises:
an eight bit type field;
an eight bit code field;
a sixteen bit checksum field;
an eight bit length field;
a twenty-four bit reserved field;
a thirty-two bit timestamp in seconds field;
a thirty-two bit timestamp in fractions of a second field; and
an original datagram field that has a size that is a multiple of thirty-two bits.

13. The network device of claim 8, wherein the one or more actions includes sending an Internet Control Message Protocol (ICMP) OAM message to a source IP address included in the IP packet header, wherein the ICMP OAM message comprises a code field that indicates that the ICMP OAM message is not an error message.

14. The network device of claim 8, wherein the one or more actions includes sending an Internet Control Message Protocol (ICMP) OAM message to a source IP address included in the IP packet header, wherein the ICMP OAM message comprises a timestamp in seconds field, and wherein the timestamp in seconds field indicates a time, in a network time protocol (NTP) format, at which the network device received the IP packet.

15. The network device of claim 8, wherein the one or more actions includes sending telemetry information concerning the IP packet to a monitoring device, wherein the telemetry information includes the IP packet and indicates a time at which the network device received the IP packet.

16. A non-transitory computer-readable medium storing instructions, the instructions comprising:
one or more instructions that, when executed by one or more processors of a network device, cause the one or more processors to:
receive, from a different network device that is not an intended recipient of an internet protocol (IP) packet, the IP packet that includes an IP packet header,
wherein the IP packet header includes a source IP address and a destination IP address,
wherein the IP packet header is supplemented with at least one extension header that includes an Operations and Management capabilities (OAM) option that indicates one or more actions to be performed by the network device; determine an IP address of the network device,
wherein the intended recipient is a particular network device to ultimately receive the IP packet and not transmit the IP packet to another network device, and
wherein the different network device transmitted the IP packet to the network device without processing the OAM option based on the IP address of the different network device failing to match the destination IP address;
determine that the network device is the intended recipient and that the at least one extension header includes the OAM option based on parsing the at least one extension header,
wherein the one or more instructions, that cause the one or more processors to determine that the at least one extension header comprises the OAM option, causes the one or more processors to one or more of:
determine that a first destination options header includes the OAM option and determine that the IP address of the network device matches the destination IP address, or
determine that a second destination options header includes the OAM option and determine that the IP address of the network device matches the destination IP address, and
wherein the intended recipient includes the network device to ultimately receive the IP packet;
process, based on determining that the network device is the intended recipient and that the at least one extension header includes the OAM option, the OAM option to determine the one or more actions in a field of the OAM option,
generate, based on determining the one or more actions in the field of the OAM option, an Internet Control Message Protocol (ICMP) OAM message,
wherein sending the ICMP OAM message is an action, of the one or more actions, indicated in the field of the OAM option; and
send the ICMP OAM message to the source IP address included in the IP packet header.

17. The non-transitory computer-readable medium of claim 16, wherein the OAM option comprises an option type field that comprises a plurality of bits,
wherein one or more bits, of the plurality of bits, indicate, to a particular network device that does not recognize the option type field, that:
the particular network device is to skip over the option type field, and
the particular network device is to continue processing the first destination options header, or the second destination options header that includes the OAM option.

18. The non-transitory computer-readable medium of claim 16, wherein the ICMP OAM message comprises a length field and an original datagram field,
wherein the length field indicates a length of the original datagram field,
wherein the length is measured in thirty-two bit words.

19. The non-transitory computer-readable medium of claim 16, wherein the ICMP OAM message comprises a timestamp in seconds field and a timestamp in fractions of a second field,
wherein the timestamp in seconds field indicates a time, in seconds according to a network time protocol (NTP) format, at which the network device received the IP packet, and
wherein the timestamp in fractions of a second field indicates a time, in fractions of a second according to the NTP format, at which the network device received the IP packet.

20. The non-transitory computer-readable medium of claim 16, wherein the ICMP OAM message comprises an original datagram field that includes the IP packet zero-padded to a nearest thirty-two bit boundary.

* * * * *